(12) United States Patent
Wang et al.

(10) Patent No.: US 8,528,482 B2
(45) Date of Patent: Sep. 10, 2013

(54) HYBRID GAS GENERATOR

(75) Inventors: Dong Wang, Guangdong (CN); Jianmei He, Guangdong (CN); Junjie Li, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 5 days.

(21) Appl. No.: 13/336,628

(22) Filed: Dec. 23, 2011

(65) Prior Publication Data

US 2012/0145030 A1 Jun. 14, 2012

Related U.S. Application Data

(63) Continuation of application No. PCT/CN2010/074521, filed on Jun. 25, 2010.

(30) Foreign Application Priority Data

Jun. 26, 2009 (CN) .................... 2009 2 0133399 U

(51) Int. Cl.
*C06D 5/00* (2006.01)
*B60R 21/26* (2011.01)

(52) U.S. Cl.
USPC .................. 102/530; 280/736; 280/741

(58) Field of Classification Search
USPC ............. 102/530, 531; 280/736, 737, 741
See application file for complete search history.

(56) References Cited

U.S. PATENT DOCUMENTS

| | | | | |
|---|---|---|---|---|
| 5,803,493 A * | 9/1998 | Paxton et al. | ............ | 280/737 |
| 6,234,523 B1 * | 5/2001 | Tokoro et al. | ............ | 280/737 |
| 6,273,462 B1 | 8/2001 | Faigle et al. | | |
| 6,676,157 B2 * | 1/2004 | Nanbu | ............ | 280/736 |
| 6,799,776 B2 * | 10/2004 | Yamazaki | ............ | 280/737 |
| 2002/0130501 A1 | 9/2002 | Nanbu | | |
| 2002/0190510 A1 | 12/2002 | Yamazaki | | |
| 2007/0200325 A1 | 8/2007 | Gammill | | |
| 2009/0045612 A1 * | 2/2009 | Cox et al. | ............ | 280/741 |

FOREIGN PATENT DOCUMENTS

| | | |
|---|---|---|
| CN | 2772902 Y | 4/2006 |
| CN | 201169242 Y | 12/2008 |
| CN | 201506324 U | 6/2010 |

(Continued)

OTHER PUBLICATIONS

PCT International Search Report mailed Sep. 30, 2010, issued in related International Application No. PCT/CN2010/074521 (3 pages).

(Continued)

*Primary Examiner* — James Bergin
(74) *Attorney, Agent, or Firm* — Finnegan, Henderson, Farabow, Garrett & Dunner, LLP

(57) ABSTRACT

A hybrid gas generator includes a high pressure gas cylinder and a gas release actuating device. The gas release actuating device includes a pyrotechnic gas cylinder, an igniting assembly, and a bursting disc. The pyrotechnic gas cylinder includes a guide ring securely disposed in the pyrotechnic gas cylinder to hermetically separate the space in the pyrotechnic gas cylinder into a gas releasing chamber and a firing chamber, a piercing plug fitted with the guide ring, where the gas releasing chamber is formed with at least a vent for releasing the gas stored in the high pressure gas cylinder, and the firing chamber may be provided with a gas producing medium to produce gas for driving the piercing plug when the igniting assembly is ignited.

10 Claims, 1 Drawing Sheet

(56) References Cited

FOREIGN PATENT DOCUMENTS

| | | |
|---|---|---|
| DE | 19638838 A1 | 3/1998 |
| EP | 1323595 A1 | 7/2003 |
| GB | 2322436 | 8/1998 |

OTHER PUBLICATIONS

PCT International Preliminary Report on Patentability and Written Opinion mailed Jan. 4, 2012, issued in related International Application No. PCT/CN2010/074521 (12 pages).

* cited by examiner

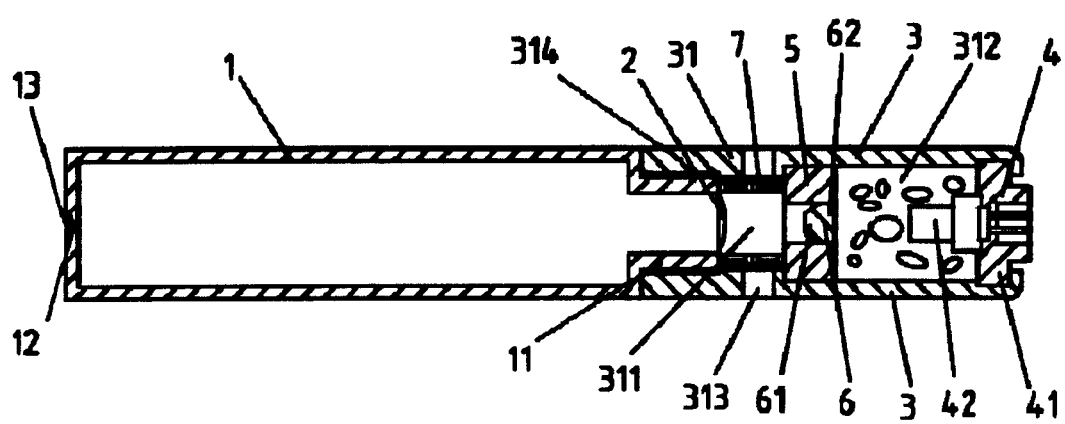

HYBRID GAS GENERATOR

CROSS-REFERENCE TO RELATED APPLICATIONS

This application is a continuation of International Application No. PCT/CN2010/074521, filed on Jun. 25 2010, which claims the benefit of priority to Chinese Patent Application No. 200920133399.5 filed with the State Intellectual Property Office of P.R. China on Jun. 26, 2009, the invention of which is incorporated by reference herein in its entirety.

FIELD

The present disclosure relates to a hybrid gas generator, more particularly to a hybrid gas generator for an automobile airbag.

BACKGROUND

With the automobile becoming a dominant mode of transport in today's world, automobile users are paying greater attention to automobile safety issues as a result of the increasing propensity of accidents. For example, one of the safety features that people consider when purchasing an automobile is the airbag, which plays a key role in automobile safety performance. Because the bar for automobile safety standards is continuously set higher due to advances in technology and government regulations, in order to improve the overall safety performance of the automobile, the performance requirement of the airbag has to be raised. This has led to stricter performance requirements of the gas generator, which is a key component of the airbag.

Currently, there are three types of gas generators: a pyrotechnic type, a high pressure gas cylinder type, and a hybrid type. The pyrotechnic gas generator is widely used, but has some disadvantages. For example, its gas production is not stable, and the residues produced may pollute the environment. Although the gas generator of the high pressure gas cylinder type has no residue pollution problem, its gas production speed is difficult to control. The hybrid gas generator combines advantages of both the pyrotechnic gas generator and the high pressure gas cylinder gas generator. One example of a hybrid gas generator in the airbag that is used in an automobile for side impact protection has been disclosed in Chinese Patent serial number CN2772902, which teaches a gas generator comprising a high pressure gas cylinder and a gas producing device. The high pressure gas cylinder has one end connected with the gas producing device. The gas producing device may comprise a pyrotechnic gas cylinder with two open ends, and a powder producing chamber inside the pyrotechnic gas cylinder. The powder producing chamber has one end provided with an electric igniter, and the other end formed with a conical neck. The pyrotechnic gas cylinder has an open exhaust hole. An arch-shaped bursting disc is provided at one end of the pyrotechnic gas cylinder. The conical neck of the powder producing chamber regulates the gas releasing direction of the gas in the powder producing chamber, which aids in breaking the bursting disc. However, the deploy speed of the airbag may not be optimal, since the gas may not be able to timely escape from the exhaust hole due to the conical neck occupying much of the relatively small exhaust space.

SUMMARY

The present invention is directed to solve at least one of the gas discharging problems existing in the prior art. Accordingly, a hybrid gas generator is provided which breaks the bursting disc quickly and allows the gas to exhaust more smoothly.

According to an embodiment, a hybrid gas generator is provided, comprising: a high pressure gas cylinder filled with high pressure gas, and formed with a discharging port at an open end; and a gas release actuating device, further comprising: a pyrotechnic gas cylinder with an open end hermetically connected with the discharging port at the open end of the high pressure gas cylinder; an igniting assembly at the other open end of the pyrotechnic gas cylinder for receiving a triggering signal to ignite; and a bursting disc disposed in the discharging port to prevent the gas from being discharged. The pyrotechnic gas cylinder may further comprise: a guide ring securely disposed in the pyrotechnic gas cylinder to hermetically separate the space within the pyrotechnic gas cylinder into a gas releasing chamber and a firing chamber; and a piercing plug fitted with the guide ring and positioned toward the bursting disc. When an inner pressure in the firing chamber exceeds a predetermined threshold, the piercing plug flies out of the guide ring to break the bursting disc. The gas releasing chamber may be formed with at least a vent for releasing the gas stored in the high pressure gas cylinder, and the firing chamber may be filled with a gas producing medium to produce gas for driving the piercing plug when the igniting assembly is ignited.

According to the present invention, the fitting of the piercing plug with the guide ring to break the bursting disc may allow additional space to be saved compared to the conical neck design taught in the prior art. In addition, the quick rupturing of the bursting disc by the piercing plug may provide for a smoother exhaust or discharge of the produced gas, thereby deploying the airbag more rapidly.

BRIEF DESCRIPTION OF THE DRAWINGS

These and other aspects and advantages of the invention will become apparent from the following descriptions in conjunction with the drawings.

FIG. 1 is a cross sectional view of a hybrid gas generator according to an embodiment of the present disclosure.

DETAILED DESCRIPTION OF THE EMBODIMENTS OF THE DISCLOSURE

Reference will be made in detail to embodiments of the present invention. The embodiments described herein with reference to drawings are explanatory, illustrative, and used to generally understand the present invention. The embodiments shall not be construed to limit the present invention. Same or similar elements, and elements having same or similar functions are denoted by common reference numerals throughout the descriptions.

According to an embodiment, a hybrid gas generator is provided, comprising: a high pressure gas cylinder 1 filled with high pressure gas, and formed with a discharging port 11 at an open end; and a gas release actuating device comprising: a pyrotechnic gas cylinder 3 with an open end hermetically connected with the discharging port 11; an igniting assembly 4 provided at the other open end of the pyrotechnic gas cylinder 3 for receiving a triggering signal to ignite; and a bursting disc 2 disposed in the discharging port 11 to prevent the gas from being discharged. The pyrotechnic gas cylinder 3 may further comprise: a guide ring 5 securely disposed in the pyrotechnic gas cylinder 3 to hermetically separate the space in the pyrotechnic gas cylinder 3 into a gas releasing chamber 311 and a firing chamber 312; and a piercing plug 6 fitted with the guide ring 5 and positioned toward the bursting disc 2. When an inner pressure in the firing chamber 312 exceeds a predetermined threshold, the piercing plug 6 flies out of the guide ring to break the bursting disc 2. The gas releasing chamber 311 may be formed with at least a vent 313 for releasing the gas stored in the high pressure gas cylinder 1, and the firing chamber 312 may be filled with a gas producing medium to produce gas for driving the piercing plug 6 when the igniting assembly 4 is ignited.

The hybrid gas generator is described in detail with reference to FIG. 1 as follows.

As shown in FIG. 1, the hybrid gas generator comprises: a high pressure gas cylinder 1, and a gas release actuating device connected with the high pressure gas cylinder 1. The discharging port 11 may be formed at an open end of the high pressure gas cylinder 1. The bursting disc 2 may be fixed in the discharging port 11. The gas release actuating device may have two open ends. The pyrotechnic gas cylinder 3 may comprise a firing chamber 312 and a gas releasing chamber 311 separated by an external shell 31 of the pyrotechnic gas cylinder 3. The gas releasing chamber 311 may, for example, be thread-connected with the discharging port 11 at one end of the firing chamber 312. The other end of the firing chamber 312 may be connected with the igniting assembly 4. A vent 313 may be formed on the external shell of the gas releasing chamber 311. The guide ring 5 may be provided in the firing chamber 312 close to the gas releasing chamber 311, and the piercing plug 6 positioned toward the bursting disc 2 may be fitted with the guide ring 5. When the pressure inside the firing chamber 312 exceeds a predetermined threshold such as the fitting strength of the guide ring 5 with the piercing plug 6, the piercing plug 6 flies out of the guide ring 5 along the central axis of the guide ring 5 toward the bursting disc 2 and breaks the bursting disc.

According to another embodiment, the bursting disc 2 may have a convex disc shape or arched disc shape with the convex side facing toward the gas releasing chamber 311. Alternatively, the bursting disc 2 may be welded in the discharging port 11. The strength of the bursting disc 2 may be predetermined so as to ensure timely rupture of the bursting disc 2 by the piercing plug 6 in an emergency. In addition, the strength of the bursting disc 2 is predetermined such that the kinetic energy of the bursting disc 2 decreases rapidly after impact by the piercing plug 6, in order to avoid damage to the high pressure gas cylinder 1. A convex bursting disc is preferable because the convex bursting disc may immediately break after impact. The high pressure gas cylinder 1 may have a gas charging port 12 and a charging port cover 13 on an end opposite to the discharging port 11. High pressure gas may be pre-charged into the high pressure gas cylinder 1 after the charging port cover 13 is opened. Generally, for safety considerations, the high pressure gas may be an inert gas with a pressure that is determined based on actual use conditions. According to another embodiment, the high pressure gas cylinder 1 may be thread-connected with the pyrotechnic gas cylinder 3. Specifically, the discharging port 11 of the high pressure gas cylinder 1 may be formed with an external thread, and the pyrotechnic gas cylinder 3 may be formed with an installation port 314 adapted to the discharging port 11. The installation port 314 may be formed with an internal thread to be engaged with the external thread of the discharging port 11. The high pressure gas cylinder 1 may be securely connected with the pyrotechnic gas cylinder 3 via the fitting of the external thread and the internal thread.

According to another embodiment, a filtering screen 7 may be disposed in the gas releasing chamber 311, and gas flowing through the discharging port 313 may be filtered by the filtering screen 7. The filtering screen 7 may filter fragments from the bursting disc 2 and residues generated from gas producing medium stored in the firing chamber 312. As shown in FIG. 1, according to an embodiment of the invention, there may be two discharging ports 313 which may be symmetrically formed on the shell 31.

The igniting assembly 4 may comprise an end cover 41 hermetically connected with the firing chamber 312, and an igniting tube 42 disposed inside the firing chamber 312. Ignition powder may be filled in the igniting tube 42. A triggering signal, for example, a sharp braking of the automobile, may be transmitted to the igniting assembly 4 to immediately ignite the ignition powder in the ignition tube 42. The external shell of the igniting tube 42 may be pushed open to ignite the firing powder filled in the firing chamber 312. The fitting strength of the igniting assembly 4 and the firing chamber 312 has to be greater than that of the piercing plug 6 with the guide ring 5. This ensures that the piercing plug 6 may be pushed by the gas in the firing chamber 312 to fly out from the guide ring 5 to break the bursting disc 2 before the igniting assembly 4 is separated from the firing chamber 4.

According to another embodiment, the guide ring 5 may have a cylindrical shape formed with an inner cylindrical hole. The piercing plug 6 may comprise a wedged portion 61 and a cylindrical portion 62 connected with the wedged portion 61. The wedged portion 61 may be positioned toward the bursting disc 2, and the external surface of the cylindrical portion 62 may be tightly or hermetically mated or fitted with the inner cylindrical hole with a predetermined fitting strength. The guide ring 5 may be fixed to the inside wall of the firing chamber 312, to form a sealed space in the firing chamber 312 for filling the ignition powder. The fitting strength of the cylindrical portion 62 with the guide ring 5 has to be less than that of the igniting assembly 4 with the firing chamber 312, in order to ensure that the plug 6 flies out of the inner cylindrical hole of the guide ring 5.

The operation of the present invention will be described in detail with reference to accompanying FIG. 1 in the following.

When a vehicle enters into an emergency situation and airbags equipped in the vehicle are to be deployed, the igniting assembly 4 of the hybrid gas generator may respond in a very short time after receiving the signal to rapidly ignite the ignition powder in the igniting assembly 4. The burning ignition powder will ignite gas producing medium, such as gas production powder stored in the firing chamber 312, at a very rapid speed. Because the firing chamber 312 is a sealed space formed by the shell of the pyrotechnic powder cylinder 3, the guide ring 5, the plug 6, and the igniting assembly 4, once the gas production powder is burned, a large amount of gas with high pressure is produced immediately to rapidly increase the pressure inside the firing chamber 312. Since the fitting strength of the igniting assembly 4 and the firing chamber 312 is greater than that of the plug 6 with the guide ring 5, the plug 6 will fly out of the guide ring 5 when the pressure inside the firing chamber 312 reaches a predetermined threshold. The plug 6, which is positioned toward the bursting disc 2, will then impact directly onto bursting disc 2 inside the discharging port 11 of the high pressure gas cylinder 1. The strength of the bursting disc 2 is predetermined to ensure timely rupture of the bursting disc 2 by the piercing plug 6 in an emergency. In addition, the strength of the bursting disc 2 has be predetermined such that the kinetic energy of the bursting disc 2 decreases rapidly after the impact by the piercing plug 6, in order to avoid damage to the high pressure gas cylinder 1. The plug 6 will drop inside the high pressure gas cylinder 1 after the impact. Due to the break or rupture of the bursting disc 2, the inert gas with high pressure stored in the high pressure gas cylinder 1 may be discharged from the discharging port 11, and may be mixed with the gas produced from the firing chamber 312. The mixed gas may be filtered by the filtering screen 7 and may be further discharged out of the hybrid gas generator through the discharging hole 313 to deploy the airbag.

The present invention employs the triggering mode of the high pressure gas cylinder, which offers improvements over the triggering mode of the gas generator by powder ignition. In the high pressure gas cylinder, the gas generator is triggered by a simple mechanically designed piercing plug with a guide ring that ensures triggering of the high pressure gas cylinder 1 and rupture of the bursting disc. In addition, the firing chamber in the hybrid gas generator may be hermetically sealed, which allows a high pressure to be stored in the firing chamber. Lastly, the discharging of the gas from the gas releasing chamber is smoother because the discharging hole formed in the gas releasing chamber is totally free from any hindrance or blockage.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. A hybrid gas generator, comprising:
   a high pressure gas cylinder formed with a discharging port at an open end; and
   a gas release actuating device comprising:
      a pyrotechnic gas cylinder with an open end hermetically connected with the discharging port;
      an igniting assembly provided at another open end of the pyrotechnic gas cylinder for receiving a triggering signal to ignite; and
      a bursting disc disposed in the discharging port to prevent the gas from being discharged;
      wherein the pyrotechnic gas cylinder further comprises:
         a guide ring securely disposed in the pyrotechnic gas cylinder to hermetically separate the space in the pyrotechnic gas cylinder into a gas releasing chamber and a firing chamber; and
         a piercing plug fitted with the guide ring and positioned toward the bursting disc to dislodge from the guide ring to break the bursting disc when an inner pressure in the firing chamber exceeds a predetermined threshold;
         wherein the gas releasing chamber is formed with at least a vent for releasing the gas stored in the high pressure gas cylinder, and the firing chamber is configured to be filled with gas producing medium to produce gas for driving the piercing plug when the igniting assembly is ignited,
            wherein after the piercing plug is dislodged from the guide ring to break the bursting disc, the firing chamber becomes in fluid communication with the gas releasing chamber.

2. The hybrid gas generator according to claim 1, further comprising a filtering screen disposed inside the gas releasing chamber to cover the vent.

3. The hybrid gas generator according to claim 1, wherein the igniting assembly comprises:
   an end cover hermetically connected with the firing chamber; and
   an igniting tube filled with ignition powder and disposed inside the firing chamber.

4. The hybrid gas generator according to claim 3, wherein the guide ring has a cylindrical shape having an inner cylindrical hole, the piercing plug has a wedged portion and a cylindrical portion connected with the wedged portion such that the wedged portion is positioned toward the bursting disc, and the guide ring and the mated piercing plug are secured in the firing chamber to form a hermetic space.

5. The hybrid gas generator according to claim 1, wherein the bursting disc has a convex disc shape with a convex side facing toward the gas releasing chamber, and the bursting disc is welded in the discharging port.

6. The hybrid gas generator according to claim 4, wherein the igniting assembly has a fitting strength with the pyrotechnic gas cylinder that is greater than a fitting strength of the piercing plug with the guide ring.

7. The hybrid gas generator according to claim 1, wherein the pyrotechnic gas cylinder is thread-connected with the discharging port.

8. The hybrid gas generator according to claim 1, wherein the strength of the bursting disc is configured such that the bursting disc breaks after impact by the piercing plug, and further configured to prevent breaking the high pressure gas cylinder after the impact by the piercing plug.

9. A vehicle comprising the hybrid gas generator according to claim 1.

10. A hybrid gas generator comprising:
    a high pressure gas cylinder; and
    a gas release actuating device connected with the high pressure gas cylinder, the gas release actuating device comprising:
       a pyrotechnic gas cylinder with open ends and an igniting assembly;
          a discharging port formed at an end of the high pressure gas cylinder and connected with the gas release actuating device; and
       a bursting disc disposed in the discharging port;
       wherein the pyrotechnic gas cylinder further comprises:
       a firing chamber and a gas releasing chamber hermetically separated by a guide ring having an inner hole;
       the gas releasing chamber connected with the discharging port at an end of the firing chamber;
       the igniting assembly connected with another end of the firing chamber;
       at least one exhaust hole formed on the gas releasing chamber; and
       a piercing plug facing the bursting disc fitted in the guide ring, and when the pressure inside the firing chamber exceeds the fitting strength of the guide ring with the plug, the plug dislodges from the guide ring along the central axis of the guide ring to break the bursting disc.

* * * * *